United States Patent
Chung et al.

(10) Patent No.: US 12,314,606 B2
(45) Date of Patent: May 27, 2025

(54) COMMAND REORDER DEVICE WITH RETRY FUNCTION AND OPERATION METHOD THEREOF

(71) Applicant: Faraday Technology Corp., Hsinchu (TW)

(72) Inventors: Chang-Chin Chung, Hsinchu (TW); Shen-Chang Wang, Hsinchu (TW)

(73) Assignee: Faraday Technology Corp., Hsinchu (TW)

( * ) Notice: Subject to any disclaimer, the term of this patent is extended or adjusted under 35 U.S.C. 154(b) by 0 days.

(21) Appl. No.: 18/361,923

(22) Filed: Jul. 31, 2023

(65) Prior Publication Data

US 2024/0370204 A1 Nov. 7, 2024

(30) Foreign Application Priority Data

May 3, 2023 (TW) ................................ 112116511

(51) Int. Cl.
*G06F 3/06* (2006.01)
(52) U.S. Cl.
CPC .......... *G06F 3/0659* (2013.01); *G06F 3/0619* (2013.01); *G06F 3/0673* (2013.01)
(58) Field of Classification Search
CPC ..... G06F 3/0659; G06F 3/0619; G06F 3/0673
See application file for complete search history.

(56) References Cited

U.S. PATENT DOCUMENTS

| | | |
|---|---|---|
| 2005/0204111 A1 | 9/2005 | Natarajan |
| 2011/0131374 A1 | 6/2011 | Noeldner et al. |
| 2013/0339582 A1 | 12/2013 | Olbrich et al. |
| 2017/0286290 A1 | 10/2017 | Post et al. |
| 2018/0157415 A1* | 6/2018 | Choi .................... G06F 12/0246 |
| 2019/0294369 A1* | 9/2019 | Yun ........................ G06F 3/0658 |
| 2023/0418525 A1* | 12/2023 | Mane .................... G06F 3/0604 |

FOREIGN PATENT DOCUMENTS

TW 201403599 1/2014

OTHER PUBLICATIONS

"Office Action of Taiwan Counterpart Application", issued on Jan. 13, 2025, p. 1-p. 6.

* cited by examiner

*Primary Examiner* — Kenneth M Lo
*Assistant Examiner* — Jonah C Krieger
(74) *Attorney, Agent, or Firm* — JCIPRNET

(57) ABSTRACT

A command reorder device with a retry function and an operation method thereof are provided. The command reorder device includes a first switch circuit, multiple command buffers, a second switch circuit, and a queue control circuit. The queue control circuit controls the first switch circuit to push an input command of an input command string to a first command buffer. The queue control circuit controls the second switch circuit to pop out an output command from a second command buffer based on a programmable reorder policy. The queue control circuit checks whether an error notification is received during a monitoring period from when the output command is popped out from the second command buffer. According to the check result, the queue control circuit determines either to pop out the output command from the second command buffer again, or to release the memory space of the second command buffer.

14 Claims, 5 Drawing Sheets

COMMAND REORDER DEVICE WITH RETRY FUNCTION AND OPERATION METHOD THEREOF

CROSS-REFERENCE TO RELATED APPLICATION

This application claims the priority benefit of Taiwan application serial no. 112116511, filed on May 3, 2023. The entirety of the above-mentioned patent application is hereby incorporated by reference herein and made a part of this specification.

BACKGROUND

Technical Field

The disclosure relates to an electronic circuit, and in particular, to a command reorder device with a retry function and an operation method thereof.

Description of Related Art

A memory controller may send commands from a master to a memory. The memory may be a dynamic random access memory (DRAM) or other types of memory. If the commands from the multi-masters are written to a first in first out (FIFO) buffer of the memory controller, and input orders thereof are cmd0, cmd1, cmd2, and cmd3, then output orders of the FIFO buffer are also cmd0, cmd1, cmd2, and cmd3. It is assumed that the commands cmd0 and cmd2 are read commands (for example, a first master wants to read data from the memory) and the commands cmd1 and cmd3 are write commands (for example, a second master wants to write data into the memory). According to a read/write turn-around wait time, the output order of the FIFO buffer of the memory controller may be detrimental to the access performance of the memory.

In order to improve the access performance of the memory, the FIFO buffer inside the memory controller is replaced with a queue with a reorder function. If the commands from the multi-masters are written to the reorder queue, the reorder queue may adjust the command output order for better performance. For example, assuming that the command input orders of the reorder queue are cmd0, cmd1, cmd2, and cmd3 (where cmd0 and cmd2 are read commands, and cmd1 and cmd3 are write commands), the command output orders of the reorder queue may be cmd0, cmd2, cmd1, and cmd3. Based on the reduction in the read/write turn-around wait time, the access performance of the memory may be better.

In addition, due to certain factors, one or more bits of the command may be changed during transmission from the memory controller to the memory, causing the memory to receive wrong command data. Based on this, the memory controller must configure an additional queue with a retry function. The commands from the multi-masters are backed up in the retry queue when the commands from the multi-master are written to the reorder queue. When the command received by the memory is an error, the memory may return an error notification to the memory controller, and the memory controller may send the command backed up in the retry queue to the memory again. The chance of errors in the commands received by the memory is generally very low in a well-designed system, which means that the additional retry queue is often left unused.

It should be noted that the content in the "Description of Related Art" paragraph is configured to facilitate understanding of the disclosure. Some (or all) of the content disclosed in the "Description of Related Art" paragraph may not be known to those skilled in the art. The content disclosed in the "Description of Related Art" paragraph does not mean that the content has been known to those skilled in the art prior to the filing of the application.

SUMMARY

The disclosure provides a command reorder device with a retry function and an operation method thereof so as to integrate the retry function and the reorder function in the same set of command buffers.

In an embodiment of the disclosure, a command reorder device includes a first switch circuit, multiple command buffers, a second switch circuit, and a queue control circuit. A common terminal of the first switch circuit is configured to receive an input command string. Each command buffer is coupled to a corresponding one of multiple selection terminals of the first switch circuit. Multiple selection terminals of the second switch circuit are coupled one-to-one to the command buffers. The queue control circuit is coupled to a control terminal of the first switch circuit and a control terminal of the second switch circuit. The queue control circuit controls the first switch circuit to push an input command of the input command string to a first command buffer of the command buffers. The queue control circuit controls the second switch circuit to pop out an output command from a second command buffer of the command buffers based on a reorder policy. The queue control circuit checks whether an error notification is received during a monitoring period after the output command is popped out from the second command buffer so as to obtain a first check result. According to the first check result, the queue control circuit determines either to pop out the output command from the second command buffer again or to release the memory space of the second command buffer.

In an embodiment of the disclosure, an operation method is provided hereafter. A first switch circuit of a command reorder device is controlled by a queue control circuit of the command reorder device to push an input command in an input command string to a first command buffer in multiple command buffers. A second switch circuit of the command reorder device is controlled by the queue control circuit to pop out an output command from a second command buffer of the command buffers based on a reorder policy. It is checked by the queue control circuit whether an error notification is received during a monitoring period after the output command is popped out from the second command buffer so as to obtain a first check result. According to the first check result, it is determined by the queue control circuit either to pop out the output command from the second command buffer again or to release the memory space of the second command buffer.

Based on the above, the first switch circuit according to the embodiments of the disclosure may push the different commands (the input commands) from the master to the different command buffers. Based on the reorder policy, the second switch circuit may select one of the command buffers to pop out a command (the output command). Therefore, the command reorder device has a reorder function. After the content of any one of the command buffers (the second command buffer) is popped out, the memory space thereof may not be released immediately (the second command buffer whose output command is popped out may not be regarded as a free buffer immediately). The queue control circuit may check whether the error notification is received during the monitoring period from when the output command is popped out from the second command buffer and then determine whether to pop out the output command from the second command buffer again according to the check result. If no error notification is received during the monitoring period, the queue control circuit may release the memory space of the second command buffer for storing new input commands. Therefore, the command reorder device has a retry function. In other words, the command reorder device may integrate the retry function and the reorder function in the same set of command buffers.

In order to make the above-mentioned features and advantages of the disclosure clearer and easier to understand, the following embodiments are given and described in details with the accompanying drawings as follows.

DESCRIPTION OF THE EMBODIMENTS

Figure 1:
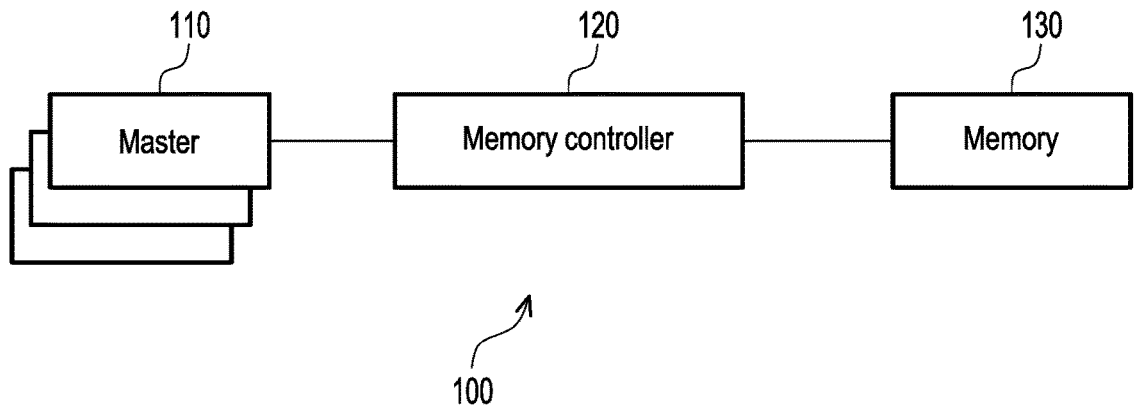
FIG. 1 is a schematic circuit block diagram of an electronic system according to an embodiment of the disclosure.

The term "coupled (or connected)" used throughout this specification (including the claims) may refer to any direct or indirect means of connection. For example, if a first device is described as being coupled (or connected) to a second device, it should be interpreted that the first device may be directly connected to the second device, or the first device may be indirectly connected to the second device through other devices or some connection means. Terms such as "first" and "second" used throughout this specification (including the claims) are used to name elements or to distinguish different embodiments or ranges, rather than to restrict the upper limit or lower limit of the number of elements, nor are they intended to restrict the order of the elements. In addition, wherever possible, elements/components/steps using the same reference numerals in the drawings and embodiments represent the same or similar parts. Elements/components/steps that have the same reference numerals or names in different embodiments may serve as reference for each other.

FIG. 1 is a schematic circuit block diagram of an electronic system 100 according to an embodiment of the disclosure. The electronic system 100 shown in FIG. 1 includes one or more masters 110. In some application examples, each master 110 may be an integrated circuit, such as a controller, a microcontroller, a microprocessor, an application-specific integrated circuit (ASIC)., a digital signal processor (DSP), a field programmable gate array (FPGA), a central processing unit (CPU), and/or other integrated circuits. In other application examples, the master 110 may be a different computing core, logic block, or module, and/or other circuits in the same integrated circuit.

The electronic system 100 shown in FIG. 1 further includes a memory controller 120 and a memory 130. Based on practical applications, the memory 130 may be any type of memory. For example, in some application examples, the memory 130 may be a dynamic random access memory (DRAM), such as a double data rate synchronous DRAM (DDR SDRAM) or other DRAMs. According to different designs, in some embodiments, the implementation of the memory controller 120 may be a hardware circuit. In some other embodiments, the implementation of the memory controller 120 may be firmware and/or software (a program). In yet other embodiments, the implementation of the memory controller 120 may be a combination of hardware, firmware, and software.

In terms of hardware, the memory controller 120 may be implemented as a logic circuit on an integrated circuit. For example, the relevant functions of the memory controller 120 may be implemented in one or more controllers, microcontrollers, microprocessors, ASICs, DSPs, FPGAs, and CPUs, and/or other processing units in various logic blocks, modules, and circuits. The relevant functions of the memory controller 120 may be implemented as hardware circuits such as various logic blocks, modules, and circuits in integrated circuits by using hardware description languages (such as Verilog HDL or VHDL) or other suitable programming languages. In terms of software and/or firmware, the relevant functions of the memory controller 120 may be implemented as programming codes. For example, common programming languages (such as C, C++, or assembly language) or other suitable programming languages are used to implement the relevant functions of the memory controller 120. The programming code may be recorded/stored in a "non-transitory machine-readable storage medium". In some embodiments, the non-transitory machine-readable storage medium includes, for example, a semiconductor memory and/or a storage device. The semiconductor memory includes a memory card, a read only memory (ROM), a flash memory, a programmable logic circuit, or other semiconductor memories. The storage device includes a hard disk drive (HDD), a solid-state drive (SSD), or other storage devices. An electronic device (such as a computer, a CPU, a controller, a microcontroller, or a microprocessor) may read and execute the programming code from the non-transitory machine-readable storage medium, thereby implementing the relevant functions of the memory controller 120.

Figure 2:
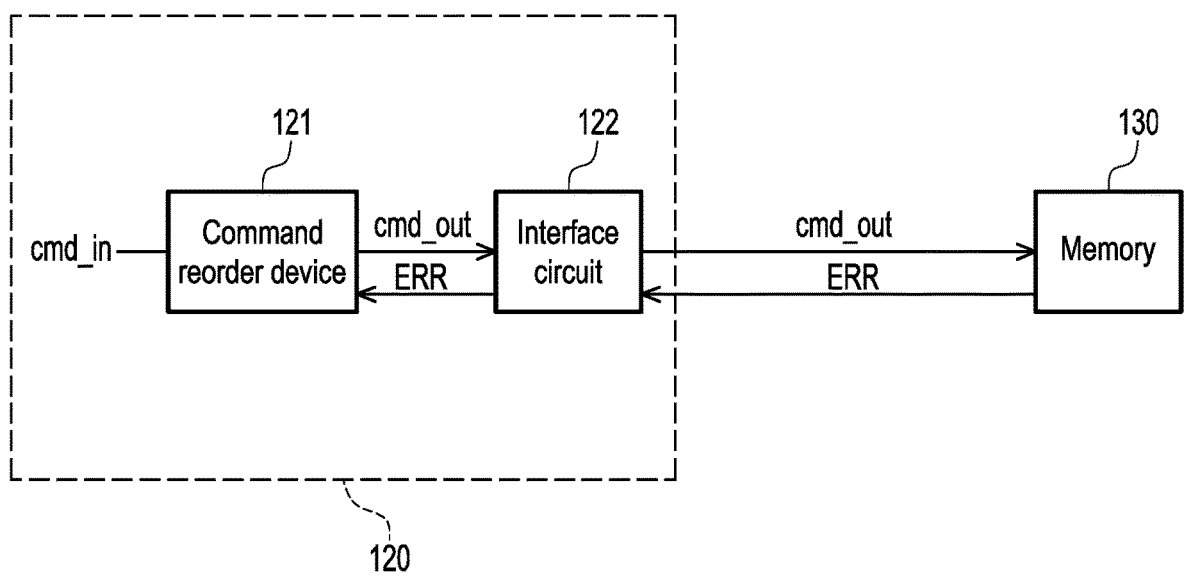
FIG. 2 is a schematic circuit block diagram of a memory controller according to an embodiment of the disclosure.

FIG. 2 is a schematic circuit block diagram of a memory controller 120 according to an embodiment of the disclosure. The memory controller 120 shown in FIG. 2 may be used as an implementation example of the memory controller 120 shown in FIG. 1. In the embodiment shown in FIG. 2, the memory controller 120 includes a command reorder device 121 and an interface circuit 122. For simplicity, the memory controller 120 shown in FIG. 2 does not show well-known internal components/circuits. In order to improve the access performance of the memory 130, the command reorder device 121 with a reorder function may reorder multiple commands in an input command string cmd_in from the master 110 and then send a reordered command string cmd_out (an output command string) to the memory 130 through the interface circuit 122. For example, assume the command order of the input command string cmd_in is cmd0, cmd1, cmd2, and cmd3 (where cmd0 and cmd2 are read commands, and cmd1 and cmd3 are write commands), then the command order of the reordered command string cmd_out may be cmd0, cmd2, cmd1, and cmd3. Based on the reduction in the read/write turn-around wait time, the access performance of the memory 130 may be better. Therefore, the command reorder device 121 has a reorder function.

The memory 130 may check each command of the reordered command string cmd_out. According to the actual design, in some embodiments, the memory 130 may use cyclic redundancy check (CRC), parity check, or other examination/check techniques to check the command data of the reordered command string cmd_out. When one or more commands received by the memory 130 are errors, the memory 130 may return an error notification ERR to the memory controller 120. The command reorder device 121 may receive the error notification ERR from the memory 130 through the interface circuit 122. When the error notification ERR indicates that a transmission error occurs in a certain command, the command reorder device 121 may transmit the command with the transmission error to the memory 130 again through the interface circuit 122. Therefore, the command reorder device 121 shown in FIG. 2 also has a retry function.

Figure 3:
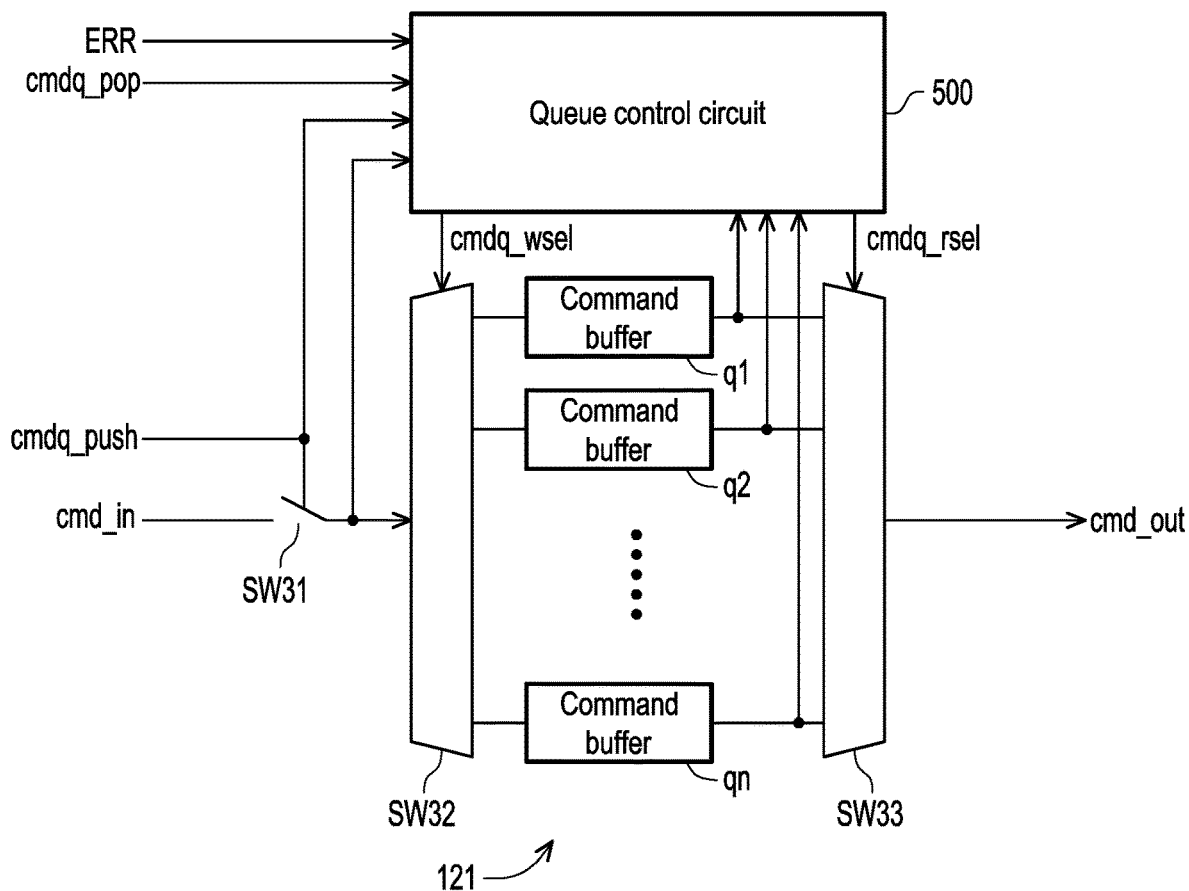
FIG. 3 is a schematic circuit block diagram of a command reorder device according to an embodiment of the disclosure.

FIG. 3 is a schematic circuit block diagram of a command reorder device 121 according to an embodiment of the disclosure. The command reorder device 121 shown in FIG. 3 may be used as an implementation example of the command reorder device 121 shown in FIG. 2. In the embodiment shown in FIG. 3, the command reorder device 121 includes multiple command buffers q1, q2 . . . , and qn. The number n of the command buffers q1 to qn may be determined according to the actual design. Each of the command buffers q1 to qn may store a command of the input command string cmd_in. Based on the actual design, each of the command buffers q1 to qn may be any type of data buffer circuit. For example, in some embodiments, each of the command buffers q1 to qn may be a multi-bit latch circuit. In some other embodiments, each of the command buffers q1 to qn may be a DRAM, a static random access memory (SRAM), or other memories.

The command reorder device 121 shown in FIG. 3 further includes a switch SW31, a switch circuit SW32, a switch circuit SW33, and a queue control circuit 500. The switch SW31 is controlled by a push signal cmdq_push. When a command is pushed to the command reorder device 121, the memory controller 120 configures the push signal cmdq_push as a high logic level, so that the switch SW31 is turned on. A common terminal of the switch circuit SW32 is coupled to the switch SW31. When the switch SW31 is turned on, the common terminal of the switch circuit SW32 may receive the input command string cmd_in through the switch SW31. Each of the command buffers q1 to qn is coupled between a corresponding one of multiple selection terminals of the switch circuit SW32 and a corresponding one of multiple selection terminals of the switch circuit SW33 as shown in FIG. 3. The queue control circuit 500 is coupled to a control terminal of the switch circuit SW32 and a control terminal of the switch circuit SW33. Based on the control of the queue control circuit 500, the switch circuit SW33 selects a command buffer (the second command buffer) from the command buffers q1 to qn and pop outs a command from the selected command buffer (an output command within the reordered command string cmd_out) to the interface circuit 122.

In some practical application scenarios, the input command string cmd_in includes different commands (input commands) from different masters 110. Based on the control of the queue control circuit 500, the switch circuit SW32 may push any one of the different commands from the different masters 110 to a free buffer of the command buffers q1 to qn. Therefore, the command reorder device 121 may support the command reorder function of the multiple masters 110. For the commands of the different masters, the command reorder device 121 may have a flexible selection capability. In other practical application scenarios, the input command string includes different commands (input commands) from the same master 110. Based on the control of the queue control circuit 500, the switch circuit SW32 may push any one of the different commands from the same master 110 to a free buffer of the command buffers q1 to qn. Therefore, the command reorder device 121 may support the command reorder function of a single master 110.

Figure 4:
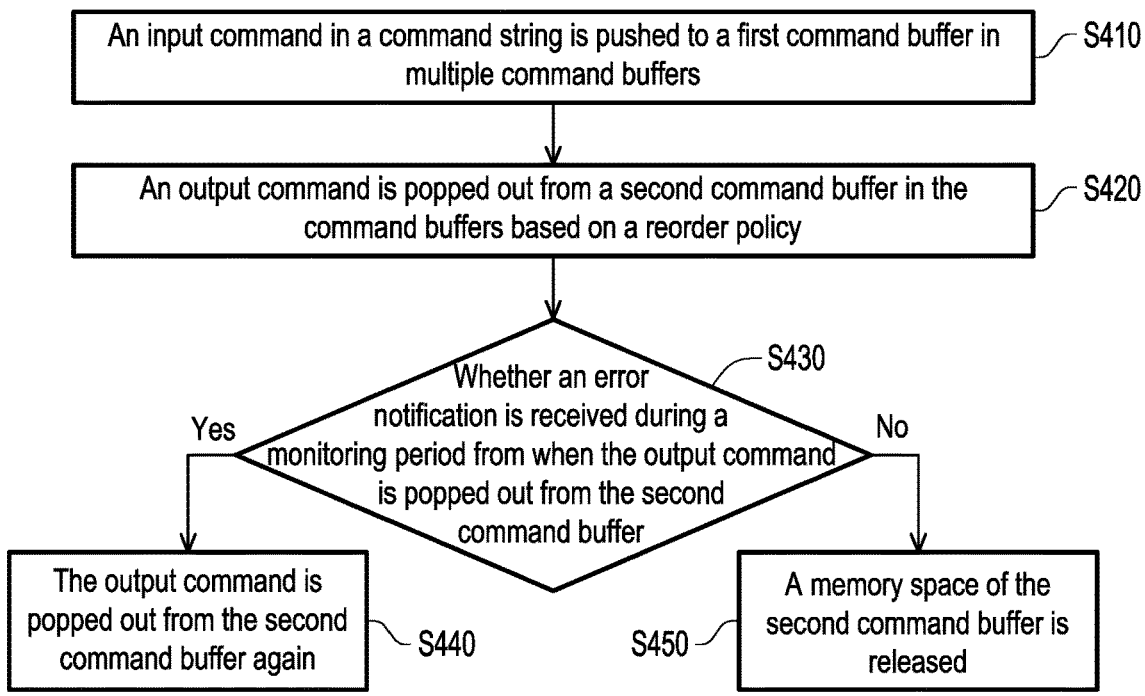
FIG. 4 is a schematic flow diagram of an operation method of a command reorder device according to an embodiment of the disclosure.

FIG. 4 is a schematic flow diagram of an operation method of a command reorder device according to an embodiment of the disclosure. Please refer to FIG. 3 and FIG. 4. The queue control circuit 500 may manage the usage status of the command buffers q1 to qn. In step S410, the switch circuit SW32 may be controlled by the queue control circuit 500 through an index signal cmdq_wsel (a command string input index signal) so as to push an input command of the input command string cmd_in to a free buffer (the first command buffer) of the command buffers q1 to qn. The index signal cmdq_wsel contains the index of the available command buffer for the next input command when the command buffers q1 to qn are not full.

In step S420, the switch circuit SW33 may be controlled by the queue control circuit 500 through an index signal cmdq_rsel (a command string output index signal) to select a command buffer (the second command buffer) from the command buffers q1 to qn based on the reorder policy and pop out the output command (as a command within the reordered command string cmd_out) from the selected command buffer to the interface circuit 122. The index signal cmdq_rsel contains the index of the selected command buffer (the second command buffer). The reorder policy may be programmed and adjusted according to actual design and/or application requirements. For example, the reorder policy may include "clustering read commands in command buffers q1 to qn, and clustering write commands in command buffers q1 to qn," or the reorder policy may include "preferentially popping out the read commands of the command buffers q1 to qn to the interface circuit 122". Therefore, the command reorder device 121 has a reorder function.

In step S430, it may be checked by the queue control circuit 500 whether the error notification ERR is received during a monitoring period from when the output command is popped out from the second command buffer. The queue control circuit 500 may determine according to the check result of step S430 either to pop out the output command from the second command buffer to the interface circuit 122 again (step S440) or to release the memory space of the second command buffer (step S450). The time length of the monitoring period may be set according to actual design. When the check result of step S430 indicates that "the error notification ERR is received during the monitoring period from when the output command is popped out from the second command buffer" (the judgment result of step S430 is "yes"), the switch circuit SW33 may be controlled by the queue control circuit 500 to pop out the output command from the second command buffer again (step S440). When the check result of step S430 indicates that "the error notification ERR is not received during the monitoring period from when the output command is popped out from the second command buffer", the index of the second command buffer may be registered by the queue control circuit 500 in a free buffer recording circuit (the details may be described later) so as to release the memory space of the second command buffer (step S450). Therefore, the command reorder device 121 has a retry function.

It is assumed here that the queue control circuit 500 selects the command buffer q2 (the second command buffer) from the command buffers q1 to qn based on the reorder policy and pop outs the output command from the selected command buffer q2 to the interface circuit 122. After the content of the command buffer q2 is popped out, the memory space of the command buffer q2 may not be released immediately (the command buffer q2 whose output command is popped out may not be regarded as a free buffer immediately), not until the monitoring period from when the time the command is popped out from the command buffer q2 ends. When the error notification ERR is received during the monitoring period from when the command is popped out from the command buffer q2, the queue control circuit 500 pop outs the output command from the command buffer q2 to the interface circuit 122 again. When no error notification ERR is received during the monitoring period from when the command is popped out from the command buffer q2, the queue control circuit 500 may release the memory space of the command buffer q2.

To sum up, the switch circuit SW32 in the above embodiment may push the different commands (the input commands) from the different masters 110 to the different command buffers. Based on the reorder policy, the switch circuit SW33 may select one of the command buffers q1 to qn to pop out a command (the output command). Therefore, the command reorder device 121 has a reorder function. After the content of any one of the command buffers q1 to qn (the second command buffer) is popped out, the memory space thereof may not be released immediately. The queue control circuit 500 may check whether an error notification is received during the monitoring period, and then determine whether to pop out the output command from the second command buffer again according to the check result. If no error notification is received during the monitoring period, the queue control circuit 500 may release the memory space of the second command buffer for storing new input commands. Therefore, the command reorder device 121 has a retry function. In other words, the command reorder device 121 may integrate the retry function and the reorder function in the same set of command buffers q1 to qn, thereby achieving a better command output order for reorder applications and reducing the configuration of storage space for retry applications.

Figure 5:
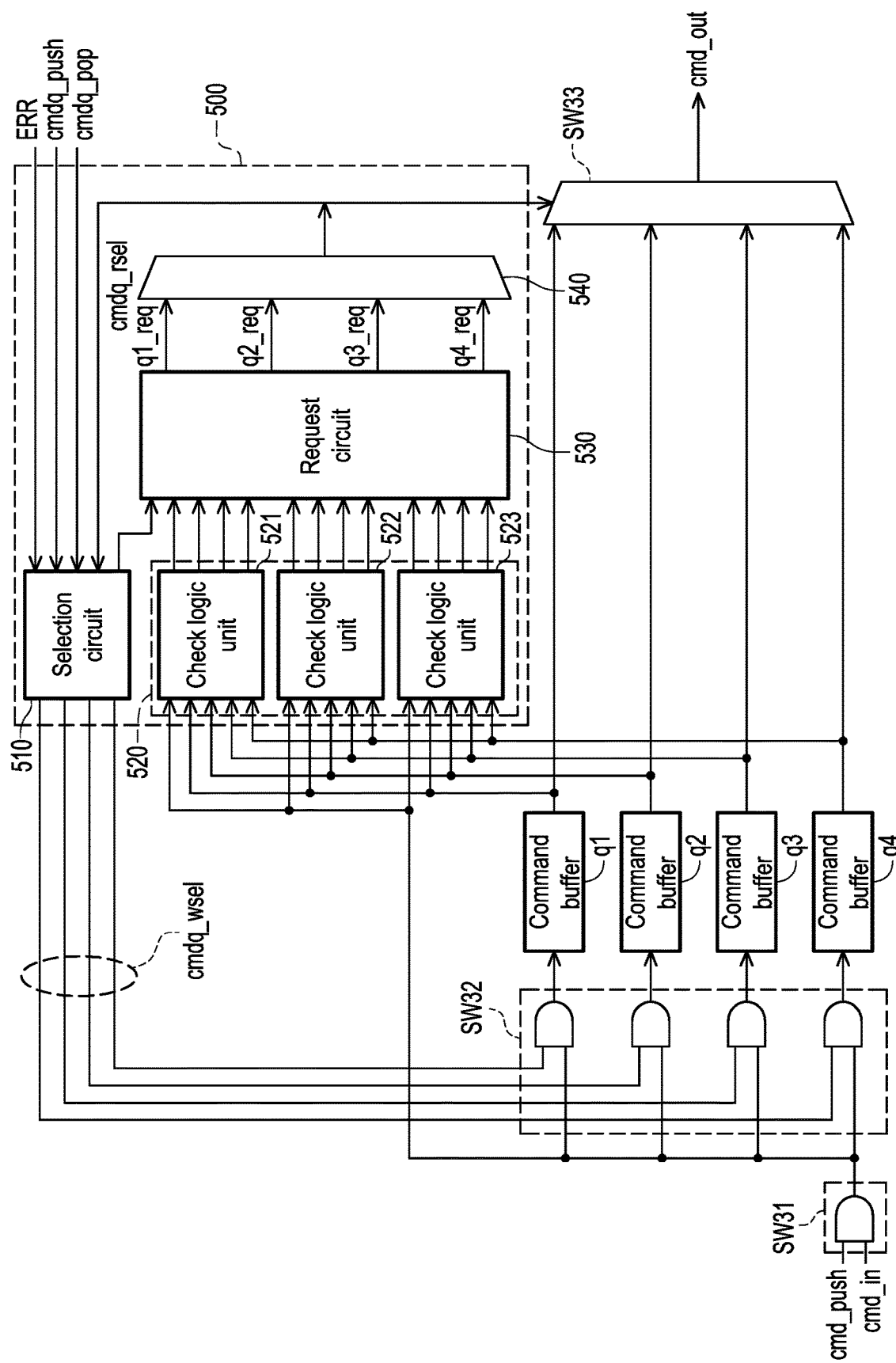
FIG. 5 is a schematic circuit block diagram of a queue control circuit according to an embodiment of the disclosure.

FIG. 5 is a schematic circuit block diagram of a queue control circuit 500 according to an embodiment of the disclosure. The queue control circuit 500 shown in FIG. 5 may be used as an implementation example of the queue control circuit 500 shown in FIG. 3. For convenience of illustration, the number n of the command buffers q1 to qn is assumed to be 4, so FIG. 5 shows the command buffers q1, q2, q3, and q4. The switch circuit SW32 shown in FIG. 5 includes four AND gates corresponding to the number of command buffers q1 to q4. The four AND gates are respectively controlled by different bits of the index signal cmdq_wsel (a command string input index signal), which then push an input command of the input command string cmd_in to a free buffer of the command buffers q1~q4 (the first command buffer).

In the embodiment shown in FIG. 5, the queue control circuit 500 includes a selection circuit 510, a check circuit 520, a request circuit 530, and a selection circuit 540. The selection circuit 510 may manage the usage status of the command buffers q1 to q4. The selection circuit 510 is coupled to the control terminal of the switch circuit SW32. The selection circuit 510 selects a free buffer (the first command buffer) from the command buffers q1 to q4. The selection circuit 510 controls the switch circuit SW32 to store the input command in the first command buffer. When the error notification ERR occurs, the selection circuit 510 may modify the valid status of the corresponding command buffer (the details may be described later).

The check circuit 520 is coupled to the command buffers q1 to q4. The check circuit 520 checks the contents of the command buffers q1 to q4 based on the reorder policy to determine whether to block the commands of the related command buffers from being popped out. The check circuit 520 configures the blocking information corresponding to each of the command buffers q1 to q4 according to the check result (a second check result) of the check circuit 520. The request circuit 530 is coupled to the check circuit 520 to receive the blocking information corresponding to the command buffers q1 to q4. The request circuit 530 determines whether to configure different pop-out requests q1_req, q2_req, q3_req, and q4_req corresponding to the command buffers q1 to q4 according to the blocking information. The request circuit 530 may control the pop-out request of the valid command buffer based on the relevant blocking information from the check circuit 520.

The selection circuit 540 is coupled to the request circuit 530 to receive the pop-out requests q1_req to q4_req corresponding to the command buffers q1 to q4. The selection circuit 540 selects one of the pop-out requests q1_req to q4_req of the command buffers q1 to q4 based on the reorder policy (or based on a round-robin scheme) to determine the target command buffer (the second command buffer) from which the output command is to be popped out. In some embodiments, when there are multiple pop-out requests from the request circuit 530, the selection circuit 540 may select command attributes with a predefined priority (e.g., read commands take precedence over write commands). The priority is programmable. In some other embodiments, when there are multiple pop-out requests from the request circuit 530, the selection circuit 540 may select a command output from the command buffers declaring the pop-out requests based on the round-robin scheme. The selection circuit 540 may control the switch circuit SW33 through an index signal cmdq_rsel (a command string output index signal) to pop out the output command from the selected command buffer (the second command buffer) to the interface circuit 122.

Based on the user-programmable output selection, the selection circuit 540 may configure the priority of the queue information or the round-robin. For example, if there are three priorities (level1 is the highest and level3 is the lowest), then the read command may be level1, the write command may be level2, and the different concerned address command may be level3. The selection circuit 540 may select the read command with the highest priority. If there is more than one read command, the selection circuit 540 may use a round-robin method to determine the command output.

Figure 6:
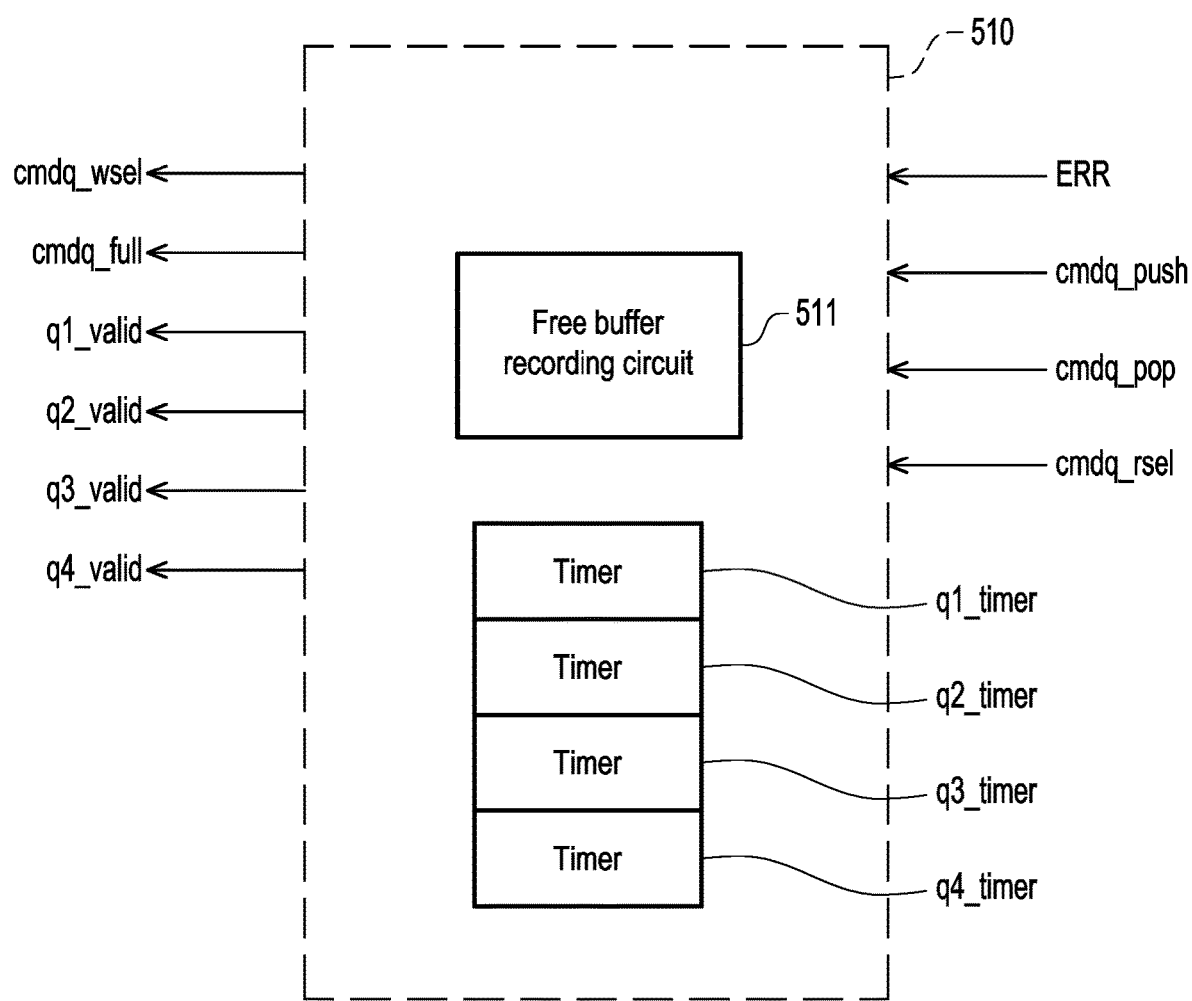
FIG. 6 is a schematic circuit block diagram of a selection circuit according to an embodiment of the disclosure.

FIG. 6 is a schematic circuit block diagram of a selection circuit 510 according to an embodiment of the disclosure. A status signal cmdq_full shown in FIG. 6 may indicate that "the command buffers q1 to q4 are full" (no free command buffers are available). When the status signal cmdq_full is at a high logic level (the command buffers q1 to q4 are full), the selection circuit 510 configures all bits of the index signal cmdq_wsel (a command string input index signal) as a low logic level, so the command buffers q1 to q4 may not accept any new commands. When a new command is pushed to the command buffers q1 to q4, the push signal cmdq_push is at a high logic level. When a command is popped out from the command buffers q1 to q4, a pop-out signal cmdq_pop is at a high logic level. Corresponding to the number of command buffers q1 to q4 shown in FIG. 5, the selection circuit 510 shown in FIG. 6 may provide four validity signals q1_valid, q2_valid, q3_valid, and q4_valid to the request circuit 530 so as to indicate the valid status of the commands of the command buffers q1 to q4. For example, when a new command is pushed to the command buffer q1, the validity signal q1_valid is at a high logic level (the command of the command buffer q1 is valid). After the commands of the command buffer q1 are popped out, the validity signal q1_valid is at a low logic level. The rest of the validity signals q2_valid to q4_valid may be deduced by referring to the description of the validity signal q1_valid, and therefore is not repeated herein.

The selection circuit 510 shown in FIG. 6 may be used as an implementation example of the selection circuit 510 shown in FIG. 5. In the embodiment shown in FIG. 6, the selection circuit 510 includes a free buffer recording circuit 511 and multiple timers. Corresponding to the number of command buffers q1 to q4 shown in FIG. 5, the selection circuit 510 shown in FIG. 6 includes four timers q1_timer, q2_timer, q3_timer, and q4_timer. Any one of the timers q1_timer to q4_timer is configured to count the monitoring period of a corresponding one of the command buffers q1 to q4.

For example, when a command is pushed into the command buffer q1, the selection circuit 510 reconfigures the timer q1_timer as the monitoring period value, and configures the validity signal q1_valid and a monitoring flag q1_valid_true corresponding to the command buffer q1 as a high logic level (indicating that the command of the command buffer q1 is valid). The monitoring period value may be determined according to the actual design. When the command of the command buffer q1 is popped out, the timer q1_timer starts counting (until the monitoring period of the command buffer q1 ends), and the selection circuit 510 changes the validity signal q1_valid to a low logic level. If the error notification ERR (the error notification ERR is "true") occurs prior to the end of the counting of the timer q1_timer (that is, prior to the end of the monitoring period of the command buffer q1), the selection circuit 510 may copy the high logic level of the monitoring flag q1_valid_true to the validity signal q1_valid (that is, the validity signal q1_valid is configured as a high logic level again), so that the command of the command buffer q1 is sent to the memory 130 again (due to the command of the command buffer q1 not being executed correctly). If the error notification ERR remains "false" during the monitoring period of the command buffer q1, the selection circuit 510 changes the monitoring flag q1_valid_true to a low logic level after the timer q1_timer counts up (due to the command of the command buffer q1 having been executed correctly), and the selection circuit 510 may push the index "q1" of the command buffer q1 into an input terminal of the FIFO buffer of the free buffer recording circuit 511 so as to release the memory space of the command buffer q1. The other timers q2_timer to q4_timer may be deduced by referring to the description of the timer q1_timer, and therefore is not repeated herein.

The free buffer recording circuit 511 may record the indexes of the free buffers of the command buffers q1 to q4. According to the actual design, in some embodiments, the free buffer recording circuit 511 may include the first in first out (FIFO) buffer. When the index signal cmdq_rsel (a command string output index signal) indicates that the command of a certain command buffer has been popped out and no error notification ERR is received during the monitoring period, the selection circuit 510 pushes the index of the command buffer into the input terminal of the FIFO buffer of the free buffer recording circuit 511. For example, when the command of the command buffer q1 is popped out, and no error notification ERR is received after the counting of the timer q1_timer ends, it means that the memory space of the command buffer q1 may be released, so the index "q1" of the command buffer q1 is pushed into the input terminal of the FIFO buffer of the free buffer recording circuit 511.

When the push signal cmdq_push indicates that "a new command needs to be pushed to the command buffers q1 to q4", the selection circuit 510 pop outs the index of the free buffer from an output terminal of the FIFO buffer of the free buffer recording circuit 511. The selection circuit 510 may generate the index signal cmdq_wsel (a command string input index signal) to the switch circuit SW32 based on the index of the free buffer popped out from the free buffer recording circuit 511. For example, assuming that the index popped out from the FIFO buffer of the free buffer recording circuit 511 points to the command buffer q1, the selection circuit 510 may control the switch circuit SW32 through the index signal cmdq_wsel to push new commands into the command buffer q1.

Please refer to FIG. 5. Based on the actual design, the check circuit 520 may include one or more check logic units corresponding to different reorder policies. For example (but not limited thereto), the check circuit 520 may include check logic units 521, 522, and 523. The check logic units 521, 522, and 523 are coupled to the command buffers q1 to q4. The check logic unit 521 may check the contents of the command buffers q1 to q4 based on a first policy of the reorder policy. According to the contents of the command buffers q1 to q4, the check logic unit 521 may configure the first blocking information corresponding to each of the command buffers q1 to q4. For example, the first policy may check the "sequence". Corresponding to the number of command buffers q1 to q4 shown in FIG. 5, the check logic unit 521 may output four pieces of blocking information q1_seq_block, q2_seq_block, q3_seq_block, and q4_seq_block (the first blocking information) to the request circuit 530. Based on the reorder policy, the request circuit 530 may choose whether to use the blocking information q1_seq_block to q4_seq_block of the check logic unit 521.

For example, when a new command is pushed into the command buffer q1, assuming that there are valid commands in other command buffers q2 to q4, the check logic unit 521 may configure the blocking information q1_seq_block corresponding to the command buffer q1 as "q2, q3, and q4". After the commands of the command buffer q3 are popped out, the check logic unit 521 may configure the blocking information q1_seq_block as "q2 and q4", indicating that the commands of the command buffer q1 must wait until the commands of the command buffers q2 and q4 are popped out. By analogy, until the commands of the other command buffers q2 to q4 are popped out, the check logic unit 521 may configure the blocking information q1_seq_block corresponding to the command buffer q1 as "not blocking". The rest of the blocking information q2_seq_block to q4_seq_block corresponding to the other command buffers q2 to q4 may be deduced by referring to the description of the blocking information q1_seq_block, and therefore is not repeated herein.

The check logic unit 522 may check the contents of the command buffers q1 to q4 based on a second policy of the reorder policy. According to the contents of the command buffers q1 to q4, the check logic unit 522 may configure the second blocking information corresponding to each of the command buffers q1 to q4. For example, the second policy may check an "identification (ID) bit". Corresponding to the number of command buffers q1 to q4 shown in FIG. 5, the check logic unit 522 may output four pieces of blocking information q1_id_block, q2_id_block, q3_id_block, and q4_id_block (the second blocking information) to the request circuit 530. Based on the reorder policy, the request circuit 530 may choose whether to pop out the blocking information q1_id_block to q4_id_block of the check logic unit 522.

For example, when a new command is pushed into the command buffer q1, assuming that the ID bit of the command of the command buffer q1 matches the ID bits of the valid commands in the other command buffers q2 to q4, the check logic unit 522 may configure the blocking information q1_id_block corresponding to the command buffer q1 as "q2, q3, and q4". After the command of the command buffer q3 is popped out, the check logic unit 522 may configure the blocking information q1_id_block as "q2 and q4". By analogy, until the commands of the other command buffers q2 to q4 are popped out, the check logic unit 522 may configure the blocking information q1_id_block corresponding to the command buffer q1 as "not blocking". The rest of the blocking information q2_id_block to q4_id_block corresponding to the other command buffers q2 to q4 may be deduced by referring to the description of the blocking information q1_id_block, and therefore is not repeated herein.

The check logic unit 523 may check the contents of the command buffers q1 to q4 based on a third policy of the reorder policy. According to the contents of the command buffers q1 to q4, the check logic unit 523 may configure the third blocking information corresponding to each of the command buffers q1 to q4. For example, the third policy may check an "address". Corresponding to the number of command buffers q1 to q4 shown in FIG. 5, the check logic unit 523 may output four pieces of blocking information q1_addr_block, q2_addr_block, q3_addr_block, and q4_addr_block (the third blocking information) to the request circuit 530. Based on the reorder policy, the request circuit 530 may choose whether to pop out the blocking information q1_addr_block to q4_addr_block of the check logic unit 523.

For example, when a new command is pushed into command buffer q1, assuming that the address bit of the command of the command buffer q1 matches the address bits of the valid commands in the other command buffers q2 to q4, the check logic unit 523 may configure the blocking information q1_addr_block corresponding to the command buffer q1 as "q2, q3, and q4". After the command of the command buffer q3 is popped out, the check logic unit 523 may configure the blocking information q1_addr_block as "q2 and q4". By analogy, until the commands of other command buffers q2 to q4 are popped out, the check logic unit 523 may configure the blocking information q1_addr_block corresponding to the command buffer q1 as "not blocking". The rest of the blocking information q2_addr_block to q4_addr_block corresponding to the other command buffers q2 to q4 may be deduced by referring to the description of the blocking information q1_addr_block, and therefore is not repeated herein.

Under the condition that the validity signal q1_valid indicates that "the command of the command buffer q1 is valid", when the blocking information corresponding to the command buffer q1 (such as the blocking information q1_seq_block, q1_id_block, and q1_addr_block) is all "unblocked", the request circuit 530 may then configure the pop-out request q1_req corresponding to the command buffer q1 as "true"; otherwise, the pop-out request q1_req is configured as "false". The rest of the pop-out requests q2_req to q4_req corresponding to the other command buffers q2 to q4 may be deduced by referring to the description of the pop-out request q1_req, and therefore is not repeated herein. By configuring one or more check logic units corresponding to different reorder policies, the check circuit 520 has scalable check conditions and blocking conditions, so as to be used in a multi-master system to implement dedicated command orders from different masters. For example, based on an ID check function of the check logic unit 522, the check circuit 520 may achieve the following: the output order of the reordered command string cmd_out may still match the command input order of the same master (the same ID) after multiple master terminals are input to the same queue. Therefore, the command reorder device shown in FIG. 5 may implement the function of reordering the commands of different master terminals. The check logic units of the check circuit 520 may be programmed and adjusted according to the reorder policy to meet different application requirements. In some practical applications, if the commands of different master terminals are allowed to be reordered, it is only necessary to disable the function of the ID check logic unit of the check circuit 520.

Figure 7:
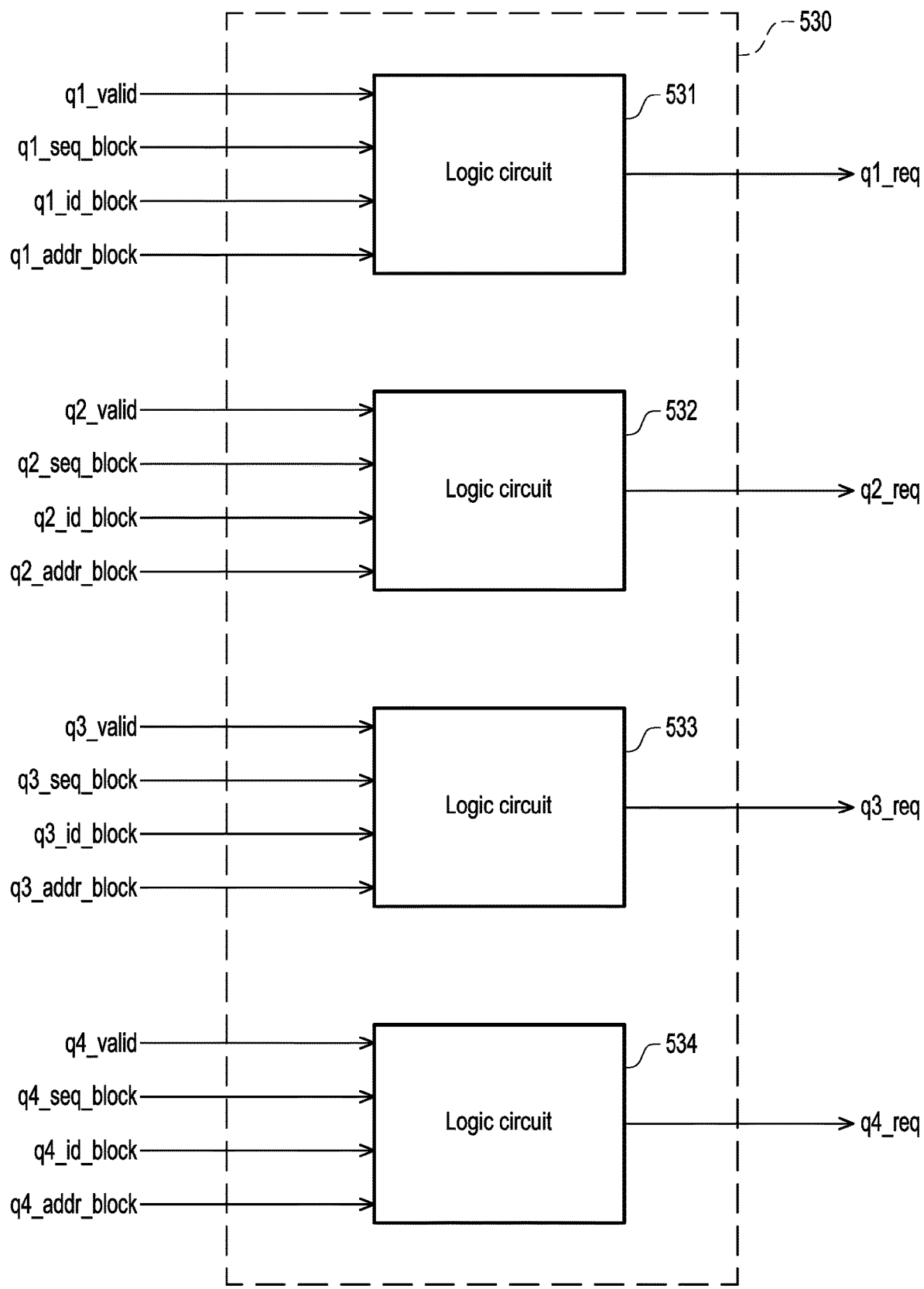
FIG. 7 is a schematic circuit block diagram of a request circuit according to an embodiment of the disclosure.

FIG. 7 is a schematic circuit block diagram of a request circuit 530 according to an embodiment of the disclosure. The request circuit 530 includes multiple logic circuits. For example, corresponding to the number of command buffers q1 to q4 shown in FIG. 5, the request circuit 530 shown in FIG. 7 may include four logic circuits 531, 532, 533, and 534. The logic circuits 531 to 534 are coupled to the check circuit 520 to receive the blocking information corresponding to the command buffers q1 to q4. Based on the design scenario shown in FIG. 5, the check logic unit 521 may output the blocking information q1_seq_block, q2_seq_block, q3_seq_block, and q4_seq_block to the logic circuits 531 to 534 respectively, and the check logic unit 522 may output the blocking information q1_id_block, q2_id_block, q3_id_block, and q4_id_block to the logic circuits 531 to 534 respectively, and the check logic unit 523 may output the blocking information q1_addr_block, q2_addr_block, q3_addr_block, and q4_addr_block to the logic circuits 531 to 534 respectively. The selection circuit 510 may output the validity signals q1_valid, q2_valid, q3_valid, and q4_valid to the logic circuits 531 to 534 to indicate the valid status of the commands of the command buffers q1 to q4.

The details of the operation of the logic circuit 531 may be described here. The logic circuits 532 to 534 may be deduced by referring to the description of the logic circuit 531, and therefore are not repeated herein. When the validity signal q1_valid indicates that "the command of the command buffer q1 is invalid", the logic circuit 531 may maintain the logic of the pop-out request q1_req as "false". When the validity signal q1_valid indicates that "the command of the command buffer q1 is valid", the logic circuit 531 may determine whether to configure the logic of the pop-out request q1_req corresponding to the command buffer q1 as "true" according to the blocking information q1_seq_block, q1_id_block, and q1_addr_block of the command buffer q1. In detail, if the blocking information q1_seq_block, q1_id_block, and q1_addr_block corresponding to the command buffer q1 all indicate "no blocking" (for example, all bits are "0"), the logic circuit 531 may configure the logic of the pop-out request q1_req of the command buffer q1 as "true". On the contrary, the logic circuit 531 may maintain the logic of the pop-out request q1_req as "false" so as to block the command output of the command buffer q1.

In summary, the switch circuit SW32 in the above embodiments may push the different commands (the input commands) from the master to the different command buffers q1 to q4. Based on the reorder policy, the switch circuit SW33 may select one of the command buffers q1 to q4 to pop out the command (the output command). Therefore, the command reorder device 121 has a reorder function. After the contents of any one of the command buffers q1 to q4 (the second command buffer) are popped out, the memory space thereof may not be released immediately (the second command buffer whose output command is popped out may not be regarded as a free buffer immediately). The queue control circuit 500 may check whether the error notification ERR is received during the monitoring period from when the output command is popped out from the second command buffer and then determine whether to pop out the output command from the second command buffer again according to the check result. If no error notification ERR is received during the monitoring period, the queue control circuit 500 may release the memory space of the second command buffer for storing new input commands. Therefore, the command reorder device 121 has a retry function. In other words, the command reorder device 121 may integrate the retry function and the reorder function into the same set of command buffers q1 to q4.

Although the disclosure has been described with reference to the embodiments above, the embodiments are not intended to limit the disclosure. Any person skilled in the art may make some changes and modifications without departing from the spirit and scope of the disclosure. Therefore, the scope of the disclosure will be defined in the appended claims.

What is claimed is:

1. A command reorder device with a retry function, comprising:
   a first switch circuit, having a common terminal for receiving an input command string;
   a plurality of command buffers, wherein each of the command buffers is coupled to a corresponding one of a plurality of selection terminals of the first switch circuit;
   a second switch circuit, wherein a plurality of selection terminals of the second switch circuit are coupled one-to-one to the command buffers; and
   a queue control circuit, coupled to a control terminal of the first switch circuit and a control terminal of the second switch circuit, wherein the queue control circuit controls the first switch circuit to push an input command of the input command string to a first command buffer of the command buffers, the queue control circuit controls the second switch circuit to pop out an output command from a second command buffer of the command buffers based on a reorder policy, the queue control circuit checks whether an error notification is received during a monitoring period from when the output command is popped out from the second command buffer so as to obtain a first check result, and the queue control circuit determines either to pop out the output command from the second command buffer again or to release a memory space of the second command buffer according to the first check result,
   wherein the queue control circuit controls the second switch circuit to pop out the output command from the second command buffer again when the first check result indicates that the error notification is received during the monitoring period from when the output command is popped out from the second command buffer; and
   the queue control circuit registers an index of the second command buffer in a free buffer recording circuit so as to release the memory space of the second command buffer when the first check result indicates that the error notification has not been received during the monitoring period from when the output command is popped out from the second command buffer.

2. The command reorder device according to claim 1, wherein the queue control circuit comprises:
   a first selection circuit, coupled to the control terminal of the first switch circuit, wherein the first selection circuit selects a free buffer from the command buffers as the first command buffer, and the first selection circuit controls the first switch circuit to store the input command in the first command buffer;
   a check circuit, coupled to the command buffers, wherein the check circuit checks contents of the command buffers based on the reorder policy so as to obtain a second check result, and the check circuit configures a blocking information corresponding to each of the command buffers according to the second check result;
   a request circuit, coupled to the check circuit to receive the blocking information corresponding to the command buffers, wherein the request circuit determines whether to configure a pop-out request corresponding to any one of the command buffers according to the blocking information; and
   a second selection circuit, coupled to the request circuit to receive the pop-out requests corresponding to the command buffers, wherein the second selection circuit selects one of the pop-out requests of the command buffers based on the reorder policy or based on a round-robin scheme to determine the second command buffer, and the second selection circuit controls the second switch circuit to pop out the output command from the second command buffer.

3. The command reorder device according to claim 2, wherein the first selection circuit comprises:
   a plurality of timers, wherein any one of the timers is configured to count the monitoring period of a corresponding command buffer of the command buffers; and
   the free buffer recording circuit, configured to record an index of the free buffer of the command buffers.

4. The command reorder device according to claim 2, wherein the check circuit comprises:
   a first check logic unit, coupled to the command buffers, wherein the first check logic unit checks the contents of the command buffers based on a first policy of the reorder policy, and the first check logic unit configures a first blocking information corresponding to each of the command buffers according to the contents of the command buffers; and
   a second check logic unit, coupled to the command buffers, wherein the second check logic unit checks the contents of the command buffers based on a second policy of the reorder policy, and the second check logic unit configures a second blocking information corresponding to each of the command buffers according to the contents of the command buffers.

5. The command reorder device according to claim 2, wherein the request circuit comprises:
a plurality of logic circuits, coupled to the check circuit to receive the blocking information corresponding to the command buffers, wherein any one of the logic circuits is configured to determine whether to configure the pop-out request of a corresponding command buffer according to the blocking information of the corresponding command buffer of the command buffers.

6. The command reorder device according to claim 1, wherein the input command string comprises different commands from different masters, the first switch circuit pushes any one of the different commands from the different masters to a free buffer of the command buffers.

7. The command reorder device according to claim 1, wherein the input command string comprises different commands from a same master, the first switch circuit pushes any one of the different commands from the same master to a free buffer of the command buffers.

8. An operation method of a command reorder device, comprising:
controlling a first switch circuit of the command reorder device by a queue control circuit of the command reorder device to push an input command of an input command string to a first command buffer of a plurality of command buffers, wherein a common terminal of the first switch circuit is configured to receive the input command string, and each of the command buffers is coupled to a corresponding one of a plurality of selection terminals of the first switch circuit;
controlling a second switch circuit of the command reorder device by the queue control circuit to pop out an output command from a second command buffer of the command buffers based on a reorder policy, wherein a plurality of selection terminals of the second switch circuit are coupled one-to-one to the command buffers;
checking whether an error notification is received during a monitoring period from when the output command is popped out from the second command buffer by the queue control circuit so as to obtain a first check result;
determining either to pop out the output command from the second command buffer again or to release a memory space of the second command buffer by the queue control circuit according to the first check result;
popping out the output command from the second command buffer again when the first check result indicates that the error notification is received during the monitoring period from when the output command is popped out from the second command buffer; and
registering an index of the second command buffer in a free buffer recording circuit so as to release the memory space of the second command buffer when the first check result indicates that the error notification is not received during the monitoring period from when the output command is popped out from the second command buffer.

9. The operation method according to claim 8, further comprising:
selecting a free buffer from the command buffers as the first command buffer to store the input command in the first command buffer;
checking contents of the command buffers based on the reorder policy so as to obtain a second check result;
configuring a blocking information corresponding to each of the command buffers according to the second check result;
determining whether to configure a pop-out request corresponding to any one of the command buffers according to the blocking information; and
selecting one of the pop-out requests of the command buffers to determine the second command buffer based on the reorder policy or a round-robin scheme.

10. The operation method according to claim 9, further comprising:
counting the monitoring period of a corresponding command buffer by any one of a plurality of timers; and
recording an index of the free buffer of the command buffers by the free buffer recording circuit.

11. The operation method according to claim 9, further comprising:
checking the contents of the command buffers so as to configure a first blocking information corresponding to each of the command buffers based on a first policy of the reorder policy; and
checking the contents of the command buffers so as to configure a second blocking information corresponding to each of the command buffers based on a second policy of the reorder policy.

12. The operation method according to claim 9, further comprising:
determining whether to configure the pop-out request of a corresponding command buffer by any one of a plurality of logic circuits according to the blocking information of the corresponding command buffer.

13. The operation method according to claim 8, wherein the input command string comprises different commands from different masters, and the operation method further comprises:
pushing any one of the different commands from the different masters to a free buffer of the command buffers by the first switch circuit.

14. The operation method according to claim 8, wherein the input command string comprises different commands from a same master, and the operation method further comprises:
pushing any one of the different commands from the same master to a free buffer of the command buffers by the first switch circuit.

\* \* \* \* \*